United States Patent [19]

Dreiling

[11] Patent Number: 4,843,769
[45] Date of Patent: Jul. 4, 1989

[54] STUMP GRINDER TOOTH SHARPENING APPARATUS

[76] Inventor: Ronald L. Dreiling, 24528 Kansas St., Newhall, Calif. 91321

[21] Appl. No.: 188,875

[22] Filed: Apr. 29, 1988

[51] Int. Cl.⁴ .............................................. B24B 3/60
[52] U.S. Cl. ...................................... 51/241 S; 76/37
[58] Field of Search .................. 51/241 S, 241 R, 247; 76/37, 40

[56] References Cited

U.S. PATENT DOCUMENTS 2,638,018 5/1953 Davis et al. ............................. 76/37

Primary Examiner—Roscoe V. Parker
Attorney, Agent, or Firm—David O'Reilly

[57] ABSTRACT

Apparatus for sharpening teeth on a stump grinding machine which includes a clamp for mounting a grinder directly on a cutting tooth. The clamp has jaws having rotatably mounted appendages which clamp directly on the back and the front face of a cutting tooth. The jaws include an adjustable arrangement for mounting the grinder motor and positioning a grinder wheel for sharpening a cutting tooth. When securely clamped on a cutting tooth a grinding motor may be mounted on the clamp and the clamp rotated about an axis through the cutting tooth face causing the grounding wheel to sharpen the cutting edge.

14 Claims, 3 Drawing Sheets

STUMP GRINDER TOOTH SHARPENING APPARATUS

FIELD OF THE INVENTION

This invention relates to an apparatus for sharpening tools, and more particularly relates to an apparatus for sharpening the cutting edge of teeth on a tree stump grinding machine.

BACKGROUND OF THE INVENTION

A difficult part of tree removal is the disposal of the stump after the tree has been cut down. One common method is to simply uproot the stumps and dispose of them. However, uprooting the stumps is not always possible or economical particularly where there are only a few stumps.

Another method of removing stumps is by cutting them away with a machine called a stump grinder. This machine utilizes a rotating vertically oriented wheel having cutting teeth mounted around the circumference of the wheel. The stump grinder tears away the stump by passing across it several times until they have completely eliminated the stump.

As can be expected, grinding down these tree stumps causes rapid deterioration of the sharp edges of the cutting teeth on the stump grinding tool; particularly when the stumps as they often are, are extremely hard woods. For this reason frequent resharpening of the cutting teeth is required. This, however, presently is a difficult and time consuming task.

Stump grinding wheels and teeth have sixteen and sometimes many more cutting teeth on them, eight on either side extending radial outward and bending slightly away from the plane of the wheel. Presently the teeth are removed from the wheel and resharpened on a grinding wheel and replaced. Each tooth is comprised of a elongate shaft or shank terminating in an angle portion or head, having a cutting face or insert brazed or silver soldered onto the head. A carbide or hardened steel insert is used for the cutting face to increase the life of the cutting teeth.

Each tooth is held on the circumference of the rotating wheel by a clamping plate which clamps and bolts the tooth to the wheel. The head and cutting face of the tooth extend outward beyond the peripheral or circumferential edge of the wheel.

Each tooth is held on the wheel by the shank fitting a socket formed by the clamping plate which is bolted to the wheel and clamped down tightly. After a period of use the bolt and clamp becomes extremely clogged and it is extremely difficult to remove the teeth. Sometimes they need to hammer or even cut the clamping plate off to remove and replace, or resharpen the teeth.

In some cases the wheels of the stump grinding machines can be as much as four feet in diameter and have one hundred and fifty sockets for receiving cutting teeth. Removal of all the teeth to sharpen them at a shop can, in some cases, take several days. Thus, there presently is no convenient method for quickly sharpening stump grinder teeth without removing them completely from the machine. Unfortunately removing each tooth for resharpening is a difficult, time consuming and expensive process.

It is therefore one object of the present invention to provide a sharpening apparatus which can sharpen stump grinder teeth without removing them from the machine.

Yet another object of the present invention is to provide a sharpening apparatus which can clamp directly to stump grinding teeth for automatically sharpening them.

Still another object of the present invention is to provide a sharpening apparatus that can be clamped onto a stump grinding tooth and can easily be brought into in proper alignment for grinding and sharpening the tooth edge.

Still another object of the present invention is to provide a sharpening apparatus which can sharpen teeth on a stump grinder at the site without removing the cutting teeth from the machine.

BRIEF DESCRIPTION OF THE INVENTION

The purpose of the present invention is to provide a sharpening apparatus which can sharpen teeth on stump grinding machines directly on the machine, without the need for the time consuming process of removing each and every tooth for resharpening.

Stump grinder teeth have a elongate square shank extending outward from the stump grinder wheel which then angle outward from the plane or surface of the wheel, approximately at an angle of forty five degrees. The head of the tooth has a extremely durable hardened steel or carbide insert on its face to provide the cutting edge. This edge, however, wears quickly as the stump grinder is passed back and forth across a stump grinding it down. Presently each tooth must be removed and the cutting edge of the hardened steel inset on the head of the tooth has to be ground to a fine edge.

A further difficulty of sharpening these teeth is that the hardened steel insert when brazed or silver soldered to the tooth are angled approximately ten degrees from the face of the tooth, providing a slightly angled face. To properly sharpen these teeth, therefore, the grinding mechanism must pass around the peripheral or heal of the insert restoring the cutting edge on the face.

To allow the clamping device to be properly positioned on the cutting tooth one finger includes an adjustable screw to vary the spacing of fingers forming the chuck of the clamping jaws, with the other side having a self-aligning pivoting surface to compensate for the slight angle of the face of the cutting insert.

Thus, the clamping jaws are made of heavy forcep like steel members having steel appendages or fingers rotatably mounted in pocket bearings in the heavy gauge steel jaws. One elongate appendage or shaft has a finger with a self-aligning swivel mounted plate providing a face for abutting the face of the tooth, clamping the tooth in opposition to the adjustable clamping finger abutting the back of the tooth. The finger abutting the back of the tooth includes a is threadably adjustable portion or screw having a locking nut to set the clamp spacing. Each of the fingers is rotatably mounted in a pocket bearing inserted in sockets and rests on thrust bearings in each of the upper and lower jaws. In this manner, the upper and lower jaws can pivot around the fingers clamped on the grinder cutting tooth.

The stump grinding tooth sharpening apparatus is comprised of a clamp having jaws and appendages or fingers having clamp surfaces which clamp on the face and back of a cutting tooth. The clamping fingers are rotatably supported in bearing sockets in the clamp jaws which are locked onto the tooth by a pair of locking handles. The jaws provide a mounting socket for receiving a grinder support assembly for mounting a grinding wheel.

One jaw of the clamping jaws has a socket for receiving a shank or boss on the grinder support assembly. The shank when fitted in the socket automatically positions the grinder with the diamond formulated cutting wheel adjacent the cutting edge of the stump grinder tooth. The grinder support assembly has a adjustable lead screw which can bring the grinding wheel into proper alignment for contact with the edge to be sharpened of the stump grinder tooth.

With the clamp properly set on the stump grinder tooth, and the grinding wheel in the proper adjustment, rotation of the clamp and grinding wheel with the grinding wheel operating will automatically sharpen the edge of a stump grinder tooth.

The above and other novel features and advantages of this invention will be fully understood from the following detailed description and the accompanying drawings, in which:

DETAILED DESCRIPTION OF THE INVENTION

Figures 1, 1A:
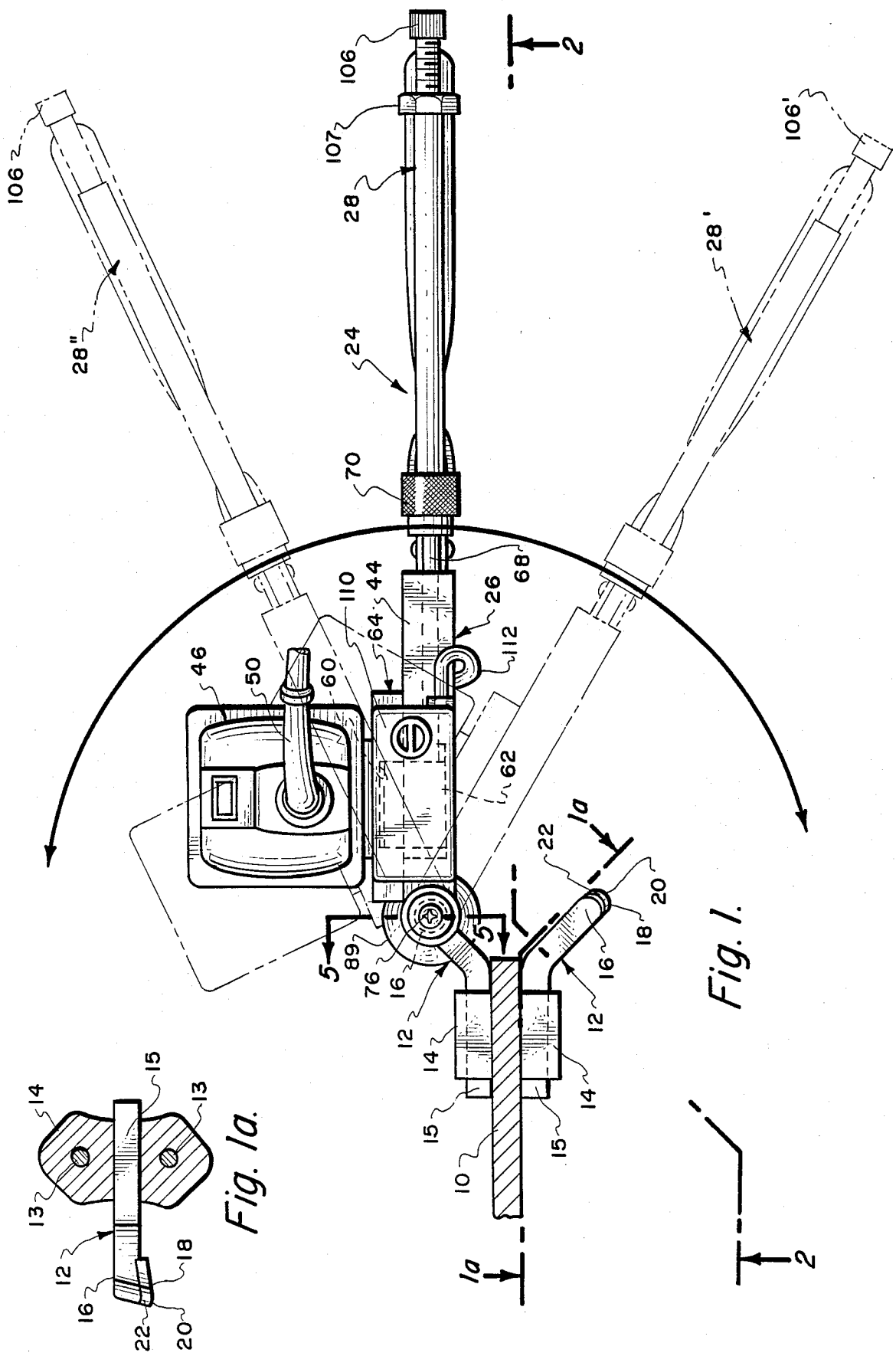
FIG. 1 is a side elevation of the stump grinder tooth sharpening apparatus clamped on a stump grinding tooth.
FIG. 1a is a sectional view taken at 1a—1a of FIG. 1.
Figure 2:
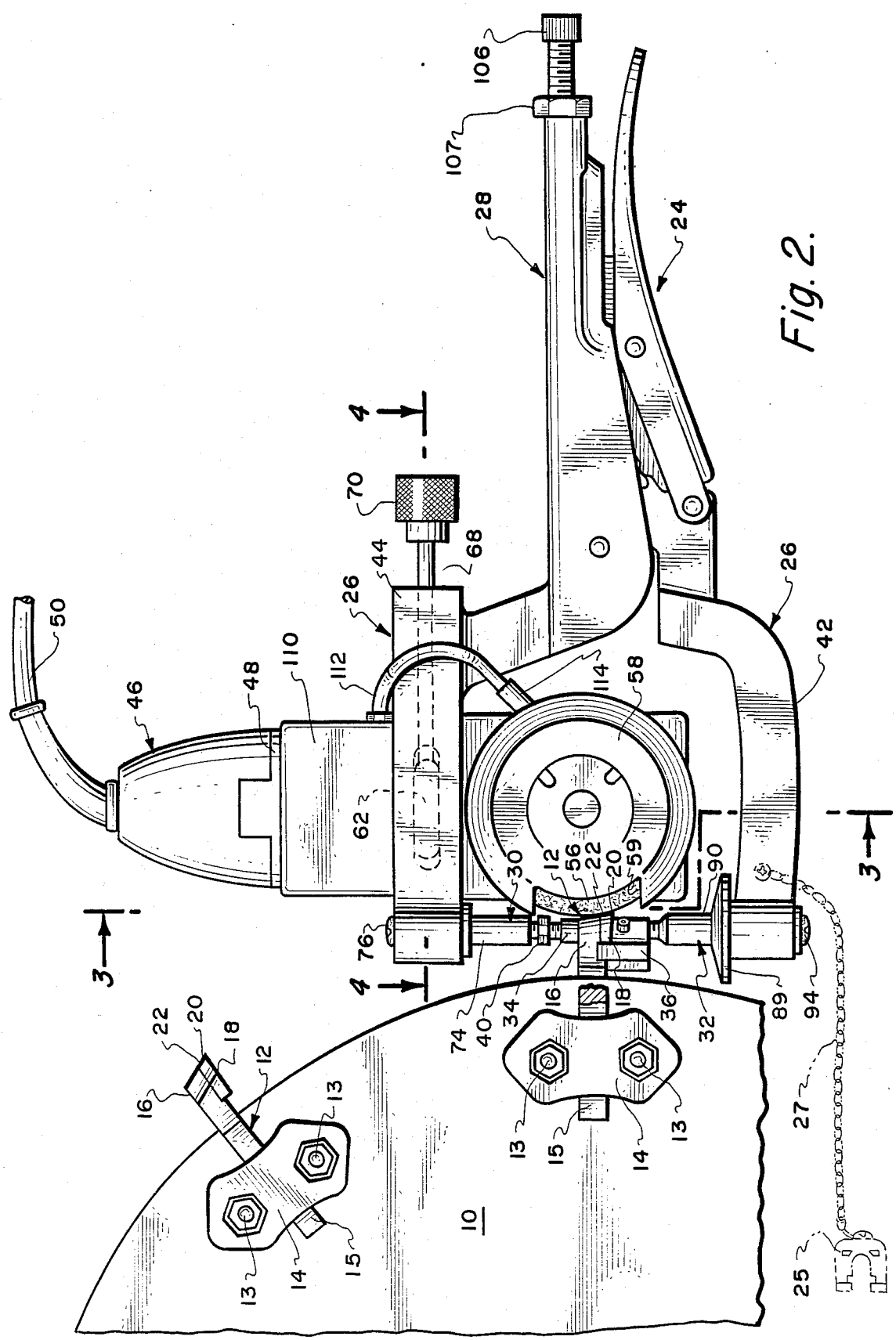
FIG. 2 is a view of the stump grinder tooth sharpening apparatus taken at 2—2 of FIG. 1.
Figure 3:
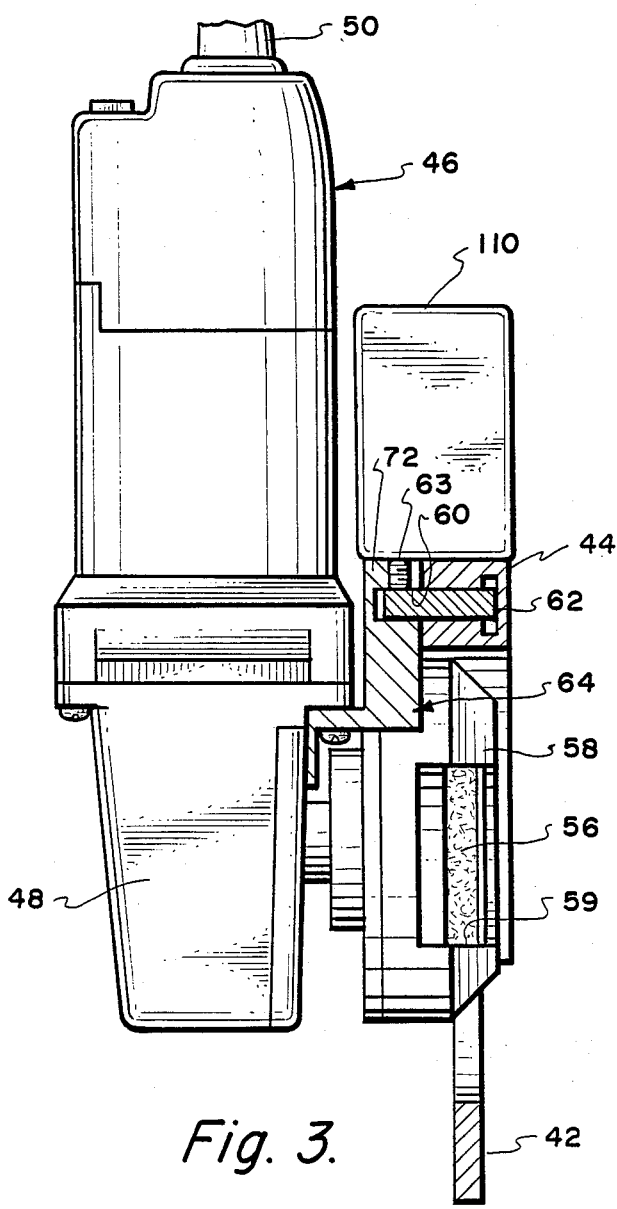
FIG. 3 is a sectional view taken at 3—3 of FIG. 2.

The present invention relates to a tooth sharpening apparatus for stump grinders generally illustrated in FIG. 1. In FIG. 1 only a partial portion of stump grinder is shown for purposes of clarity. The stump grinder generally is comprised of a motor (not shown) which drives circular plate or wheel 10 having a plurality of cutting teeth 12 clamped to the periphery, or circumference, of wheel 10 by clamping plates 14 and bolts 13 (FIG. 2). Each cutting tooth 12, as shown in FIG. 1a, is comprised of shank 15 and head 16 having cutting insert 18 brazed or silver soldered to the face of the head 16. Shank 15 fits in a pocket formed beneath clamping plate 13 and is securely fastened to wheel 10. As wheel 10 rotates cutting edges 18 of cutting teeth 12 grind or tear away the stump in a number of passes. As should be obvious, a considerably amount of debris is generated by the rotation of the stump grinder which can severely clog and jam clamping plate 14 holding the cutting tooth shank 15 on wheel 10.

Present methods of sharpening cutting teeth 12 are to remove them from wheel 10. However, clamping plate 14 can become so tight due to clogging from debris and the severe stresses on them, that it is nearly impossible to remove cutting teeth 12 without hammering off the mounting plates or even cutting them off with a torch. Obviously such a method is inefficient, costly and time consuming. The purpose of the present invention is to provide an apparatus for resharpening these teeth a number of times without the necessity of removing them from the stump grinding machine. In this way the machine can continue to be used in the field until the teeth need complete replacing.

The stump grinding teeth are comprised of a square or rectangular steel bar formed with a shank 15 and head 16 angled away from the plane or surface of wheel 10 at about forty five degrees. There are two oppositely angled teeth on either side of and equally spaced around the periphery or circumference of wheel 10. For example, a four foot diameter cutting wheel 10 may have approximately seventy five pairs, or up to one hundred a fifty grinding teeth equally spaced around its circumference. To sharpen each one of these teeth could require as much as four to eight hours just to remove the teeth from the cutting wheel, sharpen the cutting edge on a grinder and then remounted on cutting wheel 10.

The present invention avoids this costly procedure by providing a device which clamps directly on cutting head 16 of a stump grinding tooth, which can be pivoted around the tooth automatically grinding and sharpening the cutting edge of insert 18.

Cutting tooth 12 illustrated in FIG. 1(a), has a shank 15 and cutting head 16 with a tungsten carbide insert 18 braze-welded to the face of cutting head 16. The tungsten carbide insert 18 is approximately three sixteenths to a quarter of an inch thick, providing a sharp cutting edge 20. As cutting edge 20 becomes worn, it is necessary to restore it by grinding back 22 on insert 18. This is usually done by hand by placing back 22 of insert 18 against a grinding wheel. Of course, this takes considerable skill which is an added disadvantage of the present method. More frequent sharpening will be required if edge 20 is not properly ground. The grinding apparatus of the present invention does this automatically.

With the present invention the grinding wheel is clamped and positioned directly on the cutting tooth and automatically sharpens the tooth when the grinding apparatus is pivoted around cutting head 16. To perform this task the sharpening apparatus is comprised of clamp 24 having clamping jaws 26 and clamping handle 28 for locking jaws 26 on tooth 12 being sharpened. Jaws 26 provide support for grinder 46 properly positioning grinding wheel 56 adjacent cutting edge 20 of insert 18.

The grinding apparatus is shown in greater detail in FIG. 2. As can be seen in FIG. 2, shank 15 is securely clamped on stump grinder wheel 10 by plates 14 bolted with bolts 13. Clamping plates 14 and bolts 13 become frequently clogged and distorted due to the extreme conditions under which they are operated. Also, as can be seen in FIG. 2, cutting tooth 12 has a tungsten carbide insert 18 providing cutting edge 20 securely brazed or silver soldered to the surface of cutting tooth 12. The back portion 22 of the insert 12 is ground to renew the cutting edge 20 which becomes dulled through use.

The apparatus for grinding or sharpening these teeth is comprised of clamping jaws 26 having a locking handle 28 similar to that used in a device known by the trademark Vice Grips. The forward end of jaws 26 are provided with appendages or fingers 30 and 32 which produce a pincher-like effect to clamp onto cutting tooth 12. Finger 30 has an adjustable clamping pincher surface formed by screw head 34, abutting the back or rear portion of cutting tooth head 16. Finger 32 has a self-aligning swivel mounted clamping plate 36 to automatically adapt for the approximate ten degree angle of insert 18 with respect to the back of head 16 of cutting tooth 12.

To improve the clamping force of fingers 30 and 32 on cutting tooth head 16, finger 30 is provided with adjustment to vary its length. The adjustment provided by threaded insert 38 allows fingers to be in nearly perfect axial alignment when clamped on the front face and back of cutting tooth head 16. Without this adjustment there would be a slight angular displacement between the respective fingers when the clamping jaws close on the cutting tooth head. This can cause the clamp to slip off the cutting tooth when the rotational movement is made to sharpen a tooth. When the two fingers are axially aligned by adjusting threaded insert 38, the clamping force on the cutting tooth is evenly applied minimizing slippage.

The proper axial alignment of the fingers 30 and 32 is achieved by rotating clamping insert screwhead 34 to extend or retract as needed. Once properly adjusted the adjustment is locked by tightening locking nut 40. Thus, to sharpen a stump grinding tooth 20, clamping fingers 32 on jaws 26 are clamped and locked onto the face and back of cutting head 16 after adjusting to align fingers 30 and 32.

An additional improvement to prevent fingers 30 and 32 from creeping or slipping on cutting tooth 12, when rocking the grinder around the fingers is provided by a hardened steel insert or spike 35 in adjustment screwhead 34. Insert 35 has a sharp tip that provides a bit which limits angular movement to prevent the clamp from slipping off the tooth. The sharp point on insert 35 protrudes slightly from the adjustable screw head 34 when installed. The point bits into the surface of the cutting tooth, preventing any creeping, slipping, or angular movement after the clamping jars have been locked on a cutting tooth.

The clamping force of fingers 30 and 32 on the cutting tooth is varied by means of adjustment screw 106 on handle 28. Clamping force locking nut 107 locks the position of the clamping screw 106 after the alignment and clamping force adjustments are made.

Jaws 26 have upper and lower forcep-like heavy steel members 42 and 44 for supporting grinder 46 comprised of a motor 48, electric connecting cord 50 and grinding head 52 having grinding wheel 56 and grinding wheel cover 58. Grinding wheel cover 58 has a cut-out or opening 59 to expose only that portion of grinding wheel 56 adjacent stump grinding tooth insert 18.

Upper jaw 44 has a boss or shank 62 that fits a slot or socket 60 in a base or mounting plate 72 of grinder support assembly 64 attached to grinder 46. Grinding motor 46 is mounted adjacent the stump grinding tooth 12 by inserting boss 62 in key socket 60 in mounting base 72. Once boss 62 is inserted in slot 60 it is securely clamped by Allen screws (not shown).

Figure 4:
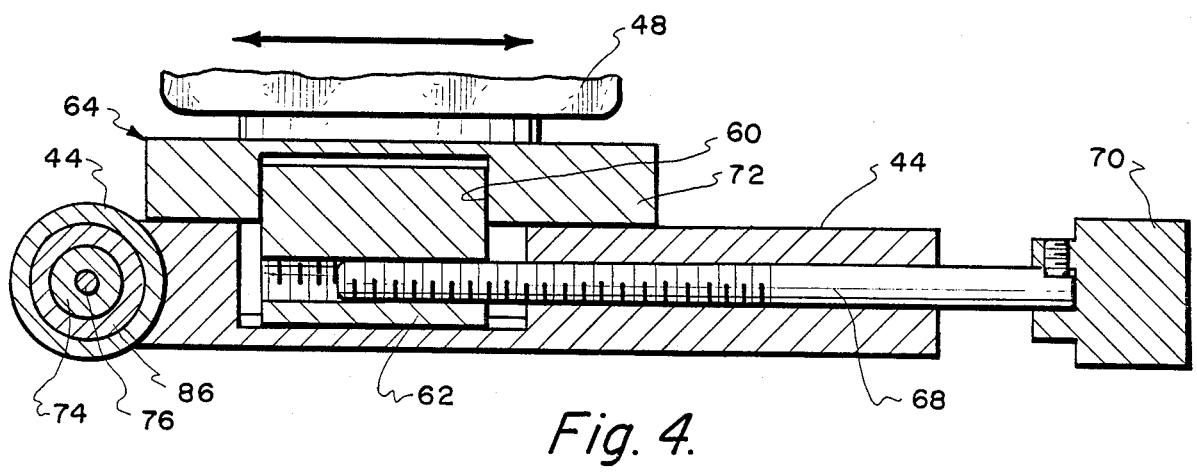
FIG. 4 is a sectional view taken at 4—4 of FIG. 3.

Upper jaw 44 adjustably supports grinder 46 to adjust the position of grinding wheel 56 relative to cutting insert 18 of stump grinding tooth 12. The details of the grinder support assembly are shown generally in FIG. 4. Boss 62 is attached to thumb screw 68 rotatably adjustable by knob 70 securely fixed to the end of the thumb screw. Boss 62 is adjustably supported in upper jaw 44 on thumb screw 68. Rotation of thumb screw 68 moves boss 62 and grinding wheel 56 toward or away from stump grinding tooth 12, as can be seen more clearly in FIG. 2.

Figure 5:
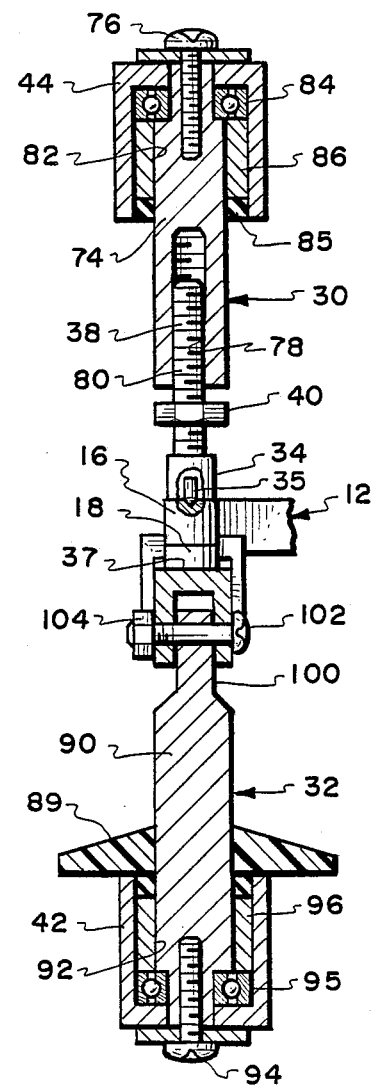
FIG. 5 is a sectional view taken at 5—5 of FIG. 1, illustrating the clamping finger construction of the clamping jaws.

The clamping arrangement or locking effect of fingers 30 and 32 for clamping against stump grinding cutting tooth 12 are shown in greater detail in the sectional view of FIG. 5 taken through the jaw clamping arrangement at 5—5 of FIG. 1. Clamping jaws 26 comprised of lower jaw 42, and upper jaw 44. Finger 30 in lower jaw 42 is a shaft 74 fastened to the jaw by screw 76. The clamping end of rod 74 has a threaded socket 78 for receiving threaded shank 38 of adjustable screw 80 allowing screw head 34 to be extended or retracted to compensate for worn cutting teeth. After adjustment to secure clamping against cutting tooth 12, nut 40 locks the position of screw head 34 setting the spacing of the clamping fingers 30 and 32. Bearings in socket 82 of upper jaw 44 rotatably support shaft 74. The lower end of shaft 74 rests on thrust bearing 84 with the lower circumference being surrounded by pocket bearing 86. Socket 82 is then sealed with a bearing seal 85.

Lower jaw 42 is constructed in a similar manner, except that allowances are made for the slight angularity of cutting insert 18 mounted on stump grinder tooth 12. Clamping finger 32 is comprised of shaft 90 mounted in socket 92 on lower jaw 42 by screw 94. The lower end of shaft 90 rests on thrust bearing 95 and pocket bearing 96 allowing shaft 90 to freely rotate in socket 92.

When the sharpening device is mounted on a cutting tooth and the sharpening process begins, fine particles shaved from the cutting tooth can interfere with and clog the bearings in the jaws 26. To prevent this from occuring, a resilient conical debris dam 89 is slipped around finger 32 and slid down to the base. This debris dam deflects any debris falling during the sharpening process away from thrust bearing 95 and pocket bearing 96.

The clamping end of finger 32 has swivel plate 36 providing a self-aligning clamping surface which will adjust to the angular face of cutting insert 18. Swivel plate 36 is mounted on reduced shank 100 on shaft 90 and fastened by bolt 102 and nut 104 allowing the swivel plate 36 to pivot. Thus the clamping surface 37 of swivel 36 automatically pivots to adjust to the surface angularity of cutting insert 18 on cutting tooth 12. With the jaws securely clamped on the back of head 16 on cutting tooth 12 and swivel plate 36 clamped securely on cutting face 18, the apparatus is now ready for use to quickly and accurately grind the cutting edge of cutting tooth 12.

To use the clamping device adjustable screw head 34 n finger 30 and swivel head 36 on finger 32 are positioned against the back and face of cutting tooth 12, respectively and their alignment adjusted. The clamping force is set by adjusting adjustment screw 106 on the clamp handle, and then fixed by tightening clamping force lock nut 107. The clamp force adjusting mechanism is the same as that used for locking pliers known by the trademark Vice Grip.

Once the jaws are securely clamped on a cutting tooth 12, grinding motor 46 is mounted by inserting boss 62 in socket 60 in motor mounting plate 72. The position of cutting wheel 56 is then adjusted by rotating thumb screw knob 70 until the cutting edge of wheel 57 is abutting back 22 of hardened steel cutting insert 18. Grinding is then initiated by turning on grinder motor 46 to automatically sharpen and restore cutting edge 20 by rotating handle 28 and jaws 26 with grinder 46 attached around surface 22 on tooth 12 as illustrated in FIG. 1a first from position indicated at 28′ to the position indicated at 28″. Several passes around surface 22 of cutting insert 18 will sharpen and restore cutting edge 20. The entire process can be completed in just a few minutes as compared to the many hours required to remove, grind and replace each stump grinding tooth by previous methods.

Since heat and hazardous metal dust is generated during the grinding process, it is desirable to add some moisture at the cutting area to cool the grinding wheel and reduce the spread of dust from a stump grinding tooth during the sharpening process. Cover 58 on grinding wheel 56 protects the grinding wheel, and allows a fluid to be dripped on grinding wheel 56 and circulated to the cutting area cooling the area and reducing dust. Fluid container 110 is mounted on clamping jaws 26, filled with a fluid which flows through hose 112, positioned to drip the fluid on diamond cutting wheel 56 through tube fitting 114 mounted on the back of cover 58. A slow continuous drip of cooling fluid on grinding wheel 56 cools and lubricates while at the same time reducing dust. A small amount of fluid, such as water, continuously dripping from container 110 is usually sufficient, but if desired, hose fitting 114 could be connected to a continuous supply of water.

A clamp alignment gauge may also be provided in the form of a U-shaped, or horseshoe-shaped member 25 configured to abut back portion 22 of cutting tooth 12. Gauge 25 extends beyond the face of tungsten carbide insert 18 and the back of tooth head 36. Guage 25 is secured to the clamp with chain 27 (FIG. 2) to prevent it from being lost. When clamping fingers 30,32 are placed against the front and back of cutting tooth 12 they are properly positioned by gauge 25 not to extend beyond cutting edge 20 so that the grinding head can properly contact back 22 of insert 18 allowing complete grinding around a substantial portion of the periphery of insert 18.

Thus there has been disclosed a novel stump grinding tooth sharpening apparatus which can quickly and easily sharpen stump grinding teeth on the stump grinding machine. The stump grinding apparatus provides a device for clamping onto the tooth itself, for properly positioning a grinder against the surface to be sharpened. A quick rotation and several passes will restore or renew the cutting edge of the stump grinding or cutting tooth. Depending upon the thickness of the cutting insert 18 on the cutting tooth, a tooth can be sharpened up to a dozen times while still on the machine before replacement is required. This substantially reduces the excessive costs of removing, grinding and replacing each cutting tooth. Additional savings are realized from the reduction in wear and tear engine life that results from using a machine having dull cutting teeth, Shay's cutting teeth substantially reduce the load on the engine and also save by causing belts, pulleys and bearings to last longer.

This invention is not to be limited by the embodiment shown in the drawings and described in the description which is given by way of example and not of limitation, but only in accordance with the scope of the appended claims.

What is claimed is:

1. Apparatus for sharpening teeth on a stump grinding machine comprising:
   clamp means for clamping to a stump grinder tooth;
   means mounting a sharpening tool on said clamp means with a grinding wheel aligned to sharpen said tooth;
   means rotating said sharpening tool around an axis through said tooth to sharpen the cutting edge;
   whereby said cutting tooth is automatically sharpened as said cutting tool is rotated about said axis.

2. Apparatus according to claim 1 in which said sharpening tool mounting means includes adjustment means for adjusting said grinding wheel on said grinding closer to or farther away from the cutting edge of stump grinder tooth.

3. Apparatus according to claim 2 in which said clamp means includes a means for accommodating for the angularity of the cutting surface of said cutting tooth.

4. Apparatus according to claim 3 in which said means for accommodating for that angularity for the cutting surface for a cutting tooth comprises;
   a pair of clamping appendages having clamping faces;
   swivel means on one of said appendages;
   one of said clamping faces being on said swivel means.

5. Apparatus according to claim 4 including means for aligning the clamping appendages to apply an even clamping force on a cutting tooth.

6. Apparatus according to claim 5 in which said means for aligning the clamping appendages comprises;
   a threaded hole in one of said appendages; a threaded shaft threaded in said threaded hole;
   one of said clamping surfaces being on the end of said thread shaft.

7. Apparatus according to claim 6 including a lock nut on said threaded shaft for locking the position of said clamping surface after adjustment.

8. Apparatus according to claim 1 in which said means for rotating said grinder means around said cutting tooth comprises;
   rotatable appendages on said clamping jaws, whereby said clamping jaws may be rotated around said cutting tooth once said clamping jaws are securely clamped on said tooth.

9. Apparatus according to claim 8 including means for accurately positioning said clamping appendages on said cutting tooth.

10. Apparatus according to claim 1 in which said means for accurately positioning said clamping appendages on a cutting tooth comprises a swiveling clamping surface allowing said clamping appendages to adjust to irregularities between the front and rear surfaces of a cutting tooth.

11. Apparatus according to claim 10 including gauge means fitting on a cutting tooth to gauge the position of clamp surfaces on the front and back of a cutting tooth.

12. Apparatus according to claim 6 including means for preventing said clamping appendages from slipping off said grinding tooth.

13. Apparatus according to claim 12 in which said means for preventing said clamping means from slipping comprises spike means on one of said appendages for securely establishing a bit on surface of said grinding tooth.

14. Apparatus according to claim 13 in which said spike means comprises a sharp pointed insert in a hole in said appendages.

* * * * *